United States Patent [19]

Smart et al.

[11] Patent Number: 5,245,760
[45] Date of Patent: Sep. 21, 1993

[54] CLOTH MEASURING APPARATUS

[75] Inventors: Lewis A. Smart, Taylors; Donald R. Price, Cross Hill, both of S.C.

[73] Assignee: Smart-Price International, Inc., Cross Hill, S.C.

[21] Appl. No.: 842,554

[22] Filed: Feb. 27, 1992

[51] Int. Cl.$^5$ ............................................. G01B 5/04
[52] U.S. Cl. ........................................ 33/735; 33/747
[58] Field of Search ............ 33/734, 735, 736, 737-749

[56] References Cited

U.S. PATENT DOCUMENTS 3,131,479 5/1964 Somogye, Jr. .
3,838,519 10/1974 Chick ..................................... 33/747
4,216,688 8/1980 Cash .................................. 33/740 X

OTHER PUBLICATIONS

Installation and Operation Manual Number 57600-90-2-01 for Durant Ambassador Series Count Control by Eaton Corporation, Watertown, Wis., 28 pages, undated.

Installation Instructions, 4 pages, dated May 1987, for 55 Series Electric Eye by OPCON, Inc., of Everett, Wash.

Data Sheet, 1 page, undated, for Series 700, ACCU--CODER brand shaft encoder by Encoder Products Company of Idaho.

Primary Examiner—William A. Cuchlinski, Jr.
Assistant Examiner—Alvin Wirthlin
Attorney, Agent, or Firm—Dority & Manning

[57] ABSTRACT

Apparatus is provided for the lineal measurement of continuous or stranded materials, such as cloth, otherwise transported past such apparatus. A gravity operated contact wheel is used to bias the materials into engagement with a measuring wheel, the rotation of which generates incremental distance pulses which are summed in a counter. An electric eye is used to detect the presence of materials to be measured so that a measurement count is held as a trailing edge of such materials departs from between the measuring roll and contact roll. The entire device may be supported on a support base which is in turn adapted to fit into a preformed opening or slot in the top surface of a work area such as a cloth cutting table. In such instance, the measuring device operates to measure cloth drawn across the table and in between the measuring and contact rolls. A display is provided to show the amount of cloth transported between the two rolls, with the entire device being bidirectional so that a user may advance or retract the cloth so as to obtain a selected or given length of cloth to be cut or otherwise processed. The counter operates in conjunction with cloth sensing to hold an accumulated measurement for a given segment of cloth whenever a trailing edge of such cloth segment is detected leaving from between the measuring and contact rolls.

13 Claims, 2 Drawing Sheets

CLOTH MEASURING APPARATUS

BACKGROUND OF THE INVENTION

The present invention in general relates to an improved measuring apparatus, and in particular to an improved electronic apparatus for the lineal measurement of materials, such as cloth transported across a cloth cutting table drawn off a cloth roll to a selected or measured length and cut.

Conventional industrial and commercial practices frequently involve the bulk manufacture of a basic material (such as fabrics or papers) in a continuous or stranded length. Such materials may be initially stored or transported to a plant in a rolled or similar condition and subsequently used in various manners in the production of finished goods. Literally hundreds of different types of materials are typically made in continuous or strand form (i.e., in bulk) and wound onto a package or roll (often tailored to the material or to machinery for handling the wound materials). For example, there are numerous types of cloth or fabric (both manmade and natural, and combinations thereof), all types of paper products and strip materials, such as wire, lace, chains, threads, and numerous other materials.

In many instances, such bulk materials are retained and transported in a rolled condition on a package or other rotatable member from which they may be subsequently unwound as desired for processing. If it is desired to withdraw measured segments from the rolls, then a technical problem is presented of accurately determining a lineal measurement of a strand or continuous type material stored in a rolled condition.

It should be apparent that in any industrial or commercial situation where a measurement is being made, the accuracy of such measurement is generally important, and may be particularly important in certain instances. For example, where a given length of continuous material is required for inclusion in a product or the like, even a slightly shortened piece (due to an inaccurate measurement) can render the entire piece of material useless, and perhaps can even create other waste in manufacture of the product if the inaccuracy is detected too late. If several shorter continuous segments have to be pieced, the resulting product might be regarded as inferior grade, i.e., a "second." Also, a piecing operation can reduce efficiency and is likely to be labor intensive, all of which adds to cost which is even more highly undesirable when only an inferior grade product is being obtained. On the other hand, uncontrolled use of excessive amounts of material (i.e., a segment longer than is required) directly generates materials waste and higher cost in production.

With certain types of materials such as wallpapers, fabrics, and the like which have repeating patterns thereon, a mismeasured cut (such as based on an inaccurate reading) can result in pattern mismatches, which can again create tremendous amounts of waste in unusable segments of material or substandard final products, even though only relatively small amounts of material might be involved in the actual inaccurate cut. For example, one tenth of a yard of material may be relatively inexpensive, but if a miscut of such degree creates an unacceptable mismatch of patterns, a relatively expensive product such as a men's or women's business suit can be rendered substandard, which could greatly reduce the market value thereof.

In addition to the foregoing concerns, it is a frequent occurrence that cloth or other fabrics on rolls or bolts are manually handled during their further processing. Such fact naturally introduces another potential factor for errors during handling, particularly in the case of measurements. In many instances, an operator is involved with drawing off cloth segments from a roll of cloth, measuring such segments, and cutting such segments. Typically such is done with an arrangement referred to as a cloth cutting table, which has a relatively clear upper surface or top work area across which the cloth or other fabric is drawn to be measured and cut. Such would be a very slow, tedious, and probably inaccurate process if the operator had to measure the segment with a yardstick or other ruler. This is particularly true for longer segments (for example, five or ten yards) which would require multiple yardstick positions for measuring and which cannot all be stretched out on the cloth cutting table at a given instant such as for ease of measurement with a tape measure. Clearly, it would not be desirable for an operator to let production materials such as cloth or paper goods which are subject to staining, etc., be spilled onto or otherwise regularly come into contact with a commercial production floor. Such a floor may often, even under the best of circumstances, have small amounts of grease or other contaminants on a concrete or similar flooring, since the large materials handling equipment, such as lifts, dollies, forklifts, etc., must be maintained with grease and the like.

More specifically, the Measuregraph Company of St. Louis, Mo., has marketed a device known as the Model 261 Counter for use on cloth cutting tables. Such product bears U.S. Pat. No. 3,131,479, by Somogye, Jr., which relates to a lineal measuring apparatus. As illustrated and discussed therein in detail, such device has opposing rolls, one of which operates as a contact roll while the other operates as a measuring roll.

Somogye, Jr., '479 discloses two basic embodiments of a mechanical lineal measuring apparatus. The embodiment of FIGS. 1 through 10 involves a lower contact roller 3 and an upper measuring roller 13, which is supported on a pair of arms or linkages 7 and 8. A contact pressure adjusting mechanism 9 makes use of a compensating spring 107 to adjust the amount of force between rolls 13 and 3.

Those of ordinary skill in the art will readily appreciate that such a compensating spring 107 is subject to tension and compression variations over time, as well as fatigue effects, which can give rise to the need to make frequent adjustments to the contact pressure. Additionally, it is inherent to the Somogye device that a controlled amount of force be used to bring together rollers 3 and 13, with excessive compression or forces thereto being a problem in one direction, while lack of adequate pressure can contribute to a roller bouncing problem which Somogye is trying to overcome. Somogye attempts to use the force of compensating spring 107 to counterbalance the effects of gravitational forces. See column 5, lines 16 through 22. However, adjusting knob 103 is intended to be used by an operator to manually select proper contact pressure for the firmness of material to be measured whenever it is desired to measure a length of material. See column 6, lines 25 through 28.

In the alternate embodiment (FIGS. 11 through 17) of Somogye, an anti-spin device is used with a lower measuring roll and an upper contact roll. The lower measuring roll is connected through a ratchet and pawl arrangement to a clutch drive, which is interconnected with a shaft 137 in turn connected through a chain drive 133 to a mechanical counter. A lifter mechanism 219 is provided to remove pressure from the relatively soft peripheries of the contact rollers 215 during their non-use, since gravity and pressure thereagainst will result in deformation. See column 8, lines 61 through 69. A projecting finger 193 is used to physically disengage the ratchet mechanism whenever materials are feed between the rolls so as to be measured.

In practice, experience shows that it is not unusual for the contact and measuring rollers of the foregoing embodiment to be left in an engaged condition, so that a flattened or worn area develops on the contact rollers, which is highly undesirable and can lead to misoperation of the measuring device (i.e.. inaccurate measurements).

Furthermore, frequent readjusting may be necessary to properly counterbalance and adjust the configuration of the parallel-motion mechanisms, and other numerous mechanical features by which a requisite contact pressure is sought to be obtained. As is readily apparent to those of ordinary skill in the art, the necessity of such adjustments provide further opportunities for the introduction of error during measurement operations, and provide another area requiring operator training and experience, which may be lacking in some instances. Maintenance to proper working order of such highly mechanical constructions is another drawback.

Still further, it is known that production demands (and inertial friction) will require an operator to pull cloth between the opposing rolls with some force. In such event, the measuring roll would tend to continue some rotation even after a trailing edge of the cloth departs from between the rolls. The mechanical arrangement of using a ratchet grip to prevent rotation of the measuring shaft during potential subsequent rotation of the measuring wheel due to built up momentum thereof, clearly has inherent limitations when it comes to accuracy of measurements.

SUMMARY OF THE INVENTION

The present invention recognizes and addresses various of the foregoing problems, and others, concerning measuring apparatus and operations. Thus, broadly speaking, a principal object of this invention is improved measuring apparatus and operations. More particularly, a main concern is improved lineal measuring, such as electronic measuring of cloth drawn across a cloth cutting table.

Another present object is to provide an improved measuring apparatus, the principles of which may be applied to and used with a wide variety of continuous or strand materials, even beyond wound fabrics or paper materials.

It is another more particular object of the present invention to provide a lineal measuring apparatus which is not only highly accurate, but relatively simple in both construction and operation. It is another general object of the present invention to provide an apparatus which is user friendly not only from the perspective of being simple to operate but relatively efficient to operate for higher worker productivity.

At the same time, it is a further more particular object to provide improved measuring apparatus which, while having a cost effective construction, is both highly reliable as to accurate measurements, and highly durable.

Still a further more particular object is to provide an improved apparatus for use in making lineal measurements in commercial or industrial settings. Within such context, it is a present more particular object to provide improved electronic cloth measuring apparatus specifically for use on a cloth cutting table.

Still more particularly, it is a present object to provide such foregoing improved apparatus adapted for insertion into a slot preformed in the top surface of a cloth cutting table, across which top surface cloth is drawn to be first measured with the present improved lineal cloth measuring device and then cut. In such context, it is a present object to provide an improved apparatus which can be retrofit to existing cloth cutting tables by being substituted in preformed table slots formerly occupied by older measuring devices, such as the basically mechanical Measuregraph Somogye, Jr., '479 patented device referenced above.

It is a still further particular object to provide such improved lineal cloth measuring device adapted for use on a cloth cutting table, which minimizes the need for constant mechanical readjustments thereof, or which otherwise minimizes inherent inaccuracies due to the use of certain mechanical features.

It is yet another present object to provide an improved electronic cloth measuring apparatus which is highly reliable and accurate, yet user friendly for measuring cloth unwound from a roll down to the hundredths of a yard. Another object is to provide improved cloth cutting table embodiments directly designed for and incorporating therein presently disclosed lineal measuring principles for continuous materials transported over a working surface of such tables.

Additional objects and advantages of the invention are set forth in, or will be apparent to those of ordinary skill in the art from, the detailed description which follows. Also, it should be further appreciated that modifications and variations to the specifically illustrated and discussed features hereof may be practiced in various embodiments and uses of this invention without departing from the spirit and scope thereof, by virtue of present reference thereto. Such variations may include, but are not limited to, substitution of equivalent means and features or materials for those shown or discussed, and the functional or positional reversal of various parts, features, or the like.

Still further, it is to be understood that different embodiments, as well as different presently preferred embodiments, of this invention may include various combinations or configurations of presently disclosed features or their equivalents (including combinations of features or configurations thereof not expressly shown in the figures or stated in the detailed description). One exemplary such embodiment of the present invention relates to apparatus for the lineal measurement of materials otherwise transported relative to a measuring line on such apparatus. Such an apparatus may comprise a measuring wheel, biasing means, materials sensor means, and an electronic tallying means.

With the foregoing embodiment, the measuring wheel preferably has a predetermined radius and a central axis about which it is rotatably mounted for rotation of the wheel in direct response to engagement therewith of materials to be measured as they are otherwise transported relative to the measuring line. The apparatus measuring line is formed in coaxial alignment with the central axis at a predetermined location at which materials to be measured are brought into engagement with the measuring wheel.

Still in relation to the foregoing exemplary embodiment, the biasing means are provided for biasing materials to be measured into engagement with the measuring wheel at the predetermined location, so that such materials engage and rotate the measuring wheel as such materials are otherwise transported relative to the measuring line. The materials sensor means are provided for producing a control signal indicative of the presence at the predetermined location of materials to be measured. The above-referenced electronic tallying means are responsive to rotation of the measuring wheel and to the materials sensor means control signal for determining a lineal measurement of a given segment of materials otherwise transported relative to the measuring line and biased by the biasing means into engagement with the measuring wheel.

Another present exemplary embodiment concerns an electronic cloth measuring apparatus for use on a cloth cutting table having associated therewith roller means for receiving a roll of cloth to be drawn off such roll at user selected lengths and cut, and further having an adjacent upper surface forming a primary work area with a slot therein across which the cloth is drawn prior to cutting.

The foregoing embodiment of a measuring apparatus in accordance with this invention may include a measuring roll, a relative rigid support arm, a contact roll, shaft sensing means, cloth sensing means, and display means.

The measuring roll is mounted preferably in the slot in a table upper surface and on a rotatable shaft with a given arc of the outside diameter of the measuring wheel projecting just above the table upper surface so that the measuring roll engages cloth drawn thereacross and rotates correspondingly. A relatively rigid support arm is preferably secured relative the cloth cutting table and extends to a position generally above the measuring wheel. The contact roll is rotatably mounted on the support arm and extendable therefrom so as to form a cloth nip in cooperation with the measuring roll so that cloth to be measured passes across the table upper surface through the cloth nip and in between the measuring roll and the contact roll.

The shaft sensing means are operatively associated with the measuring roll rotatable shaft for producing a distance output signal based on rotation of the shaft caused by cloth to be measured being drawn across the measuring roll through the cloth nip.

The above-referenced cloth sensing means are operatively associated with the axis of the measuring roll rotatable shaft for producing a cloth presence output signal indicative of whether cloth is present at a point in alignment with the shaft axis to be drawn through the cloth nip.

Lastly, the display means are for receiving the shaft sensing means distance output signal and the cloth sensing means cloth presence output signal and for displaying the total length of cloth drawn across the measuring roll and past the shaft axis of the measuring roll rotatable shaft during a given measuring operation.

Yet another construction comprising a present exemplary embodiment includes an improved lineal cloth measuring device for insertion into a slot preformed in the top surface of a cloth cutting table, across which top surface cloth is drawn to be measured and cut. Such device preferably includes a relatively rigid support base, support base mounting means, shaft encoder means, a support bracket, a relatively freely rotatable pressure contact wheel pivotably received on the support bracket and above the measuring wheel, optical proximity means, and counter means responsive to the shaft encoder means and the optical proximity means for determining the lineal amount of cloth having passed over the centerline of the measuring wheel during a given measuring operation. Display means may be further included for numerically displaying the determined lineal amount of cloth.

In addition, the foregoing embodiment may comprise yet a further embodiment of the present invention by further combination thereof with a cloth cutting table having a top surface comprising a work area for a user to draw cloth thereacross, and with a slot preformed in such top surface thereof for receiving the support base. Such an arrangement further has associated with the table roller means for receiving a roll of cloth to be drawn off such roll at user selected lengths to be measured with said device for cutting of such cloth.

Those of ordinary skill in the art will better appreciate the features and aspects of such embodiments and others upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended features, in which.

Repeat use of reference characters throughout the present specification and appended drawings is intended to represent same or analogous features or elements of the invention.

DETAILED DESCRIPTION OF THE PREFERRED EMBODIMENTS

Figures 1, 2:
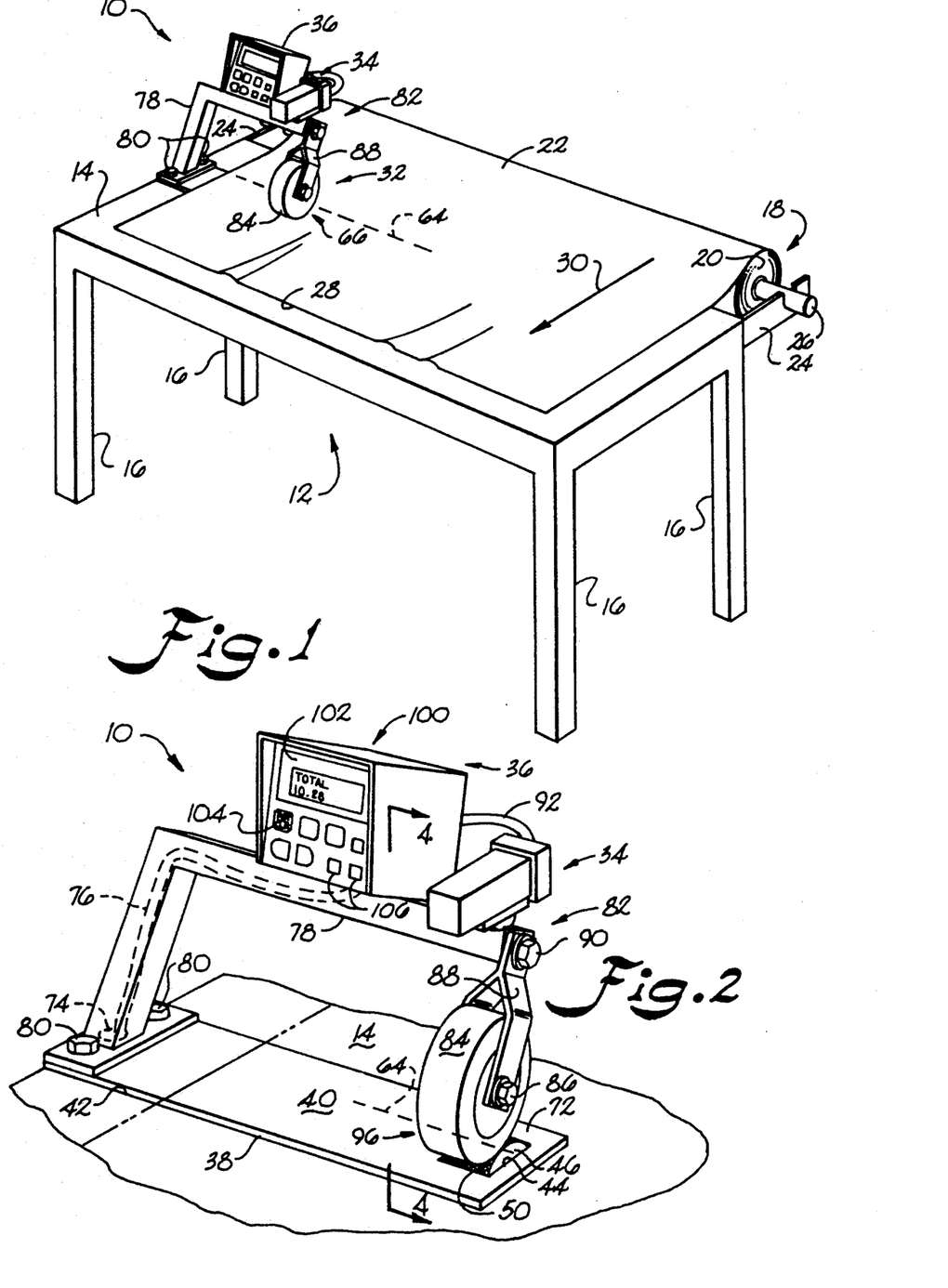
FIG. 1 is a perspective view of an exemplary embodiment of the present invention illustrating use thereof with an exemplary conventional cloth cutting table.
FIG. 2 is an enlarged perspective view of the exemplary embodiment represented in present FIG. 1, with the cloth cutting table shown in partial cutaway.

FIG. 1 illustrates a generally front perspective view of an exemplary apparatus generally 10 in accordance with the present invention. More particularly, such apparatus 10 is provided for the lineal measurement of materials otherwise transported relative thereto, and in the specific presently illustrated exemplary embodiment comprises an improved lineal cloth measuring device 10 for use on a cloth cutting table 12. It will be understood by those of ordinary skill in the art that the following detailed description is by way of example only in relation to such exemplary embodiment as an improved lineal cloth measuring device, and that the subject invention is not limited to such use or use with such materials. In addition, various modifications and variations may be practiced on the embodiment herewith, and during the course of other uses, for example as referenced by way of various examples and suggestions hereinafter, and others.

FIG. 1 illustrates the present apparatus in use with an exemplary conventional cloth cutting table generally 12, having an upper surface 14 forming a primary work area supported by legs 16 or the like. Such table 12 may have associated therewith (integrally or stand alone) roller means 18 for receiving a roll 20 of cloth 22 to be drawn off such roll 20 at user selected lengths and cut. In the illustrated example, roller means 18 may comprise a pair of trough elements 24 directly supported on table 12 and supporting opposite ends of a shaft 26, which in turn rotatably supports roll 20.

As understood by those of ordinary skill in the art, a leading edge 28 of material to be measured (in this instance, cloth) is manually drawn across top surface 14 generally in the direction of arrow 30. Apparatus 10 in accordance with this invention makes use of a measuring wheel, which in the exemplary embodiment of present FIG. 1 is beneath cloth 22 (i.e.. not seen). Movement of cloth 22 across the measuring wheel directly engages such wheel, which causes it to rotate in the same direction in which cloth 22 is moving. Hence, if cloth 22 were to be retracted (i.e., pulled in the direction opposite of arrow 30) the measuring wheel would be correspondingly engaged and moved in such opposite direction. Such an operation might well occur during a given measuring operation as the operator moves the cloth back and forth to reach an exact desired measurement of cloth to be obtained.

With further reference to the present apparatus 10 in accordance with this invention, biasing means generally 32 are provided for biasing the materials or cloth 22 to be measured into engagement with the measuring wheel at a predetermined location. Such location is generally formed in coaxial alignment with the central axis about which the measuring wheel rotates, as discussed below, and occurs at the peripheral location of such measuring wheel at which materials (e.g., cloth) to be measured are brought into engagement with such measuring wheel. With the assistance of the biasing means 32, cloth 22 engages and rotates the measuring wheel as such cloth materials are otherwise transported relative to the measuring line as described above.

Still further in accordance with the present invention, materials sensor means generally 34 are provided for producing a control signal indicative of the presence at such predetermined location of the materials to be measured (i.e., the above-referenced location at which the materials 22 to be measured are brought into engagement with the measuring wheel).

Still further in accordance with this invention, electronic tallying means generally 36 are provided and are responsive to rotation of the measuring wheel and responsive to a control signal output by the materials sensor means, for determining a lineal measurement of a given segment of cloth 22 otherwise transported relative to the measuring wheel and biased by biasing means 32 into engagement with such measuring wheel.

It will be further understood from the remaining disclosure that another present exemplary embodiment of the subject invention includes the illustrated apparatus 10 in combination with a cloth cutting table 12 and roller means 18, as represented in subject FIG. 1. In such instances, table 12 may be specifically designed to receive apparatus 10 integrally, instead of being retrofit therewith as described hereinafter.

Further to the brief overview above of the subject invention, greater details thereof are provided hereinafter with reference to FIGS. 2 through 4.

Figure 3:
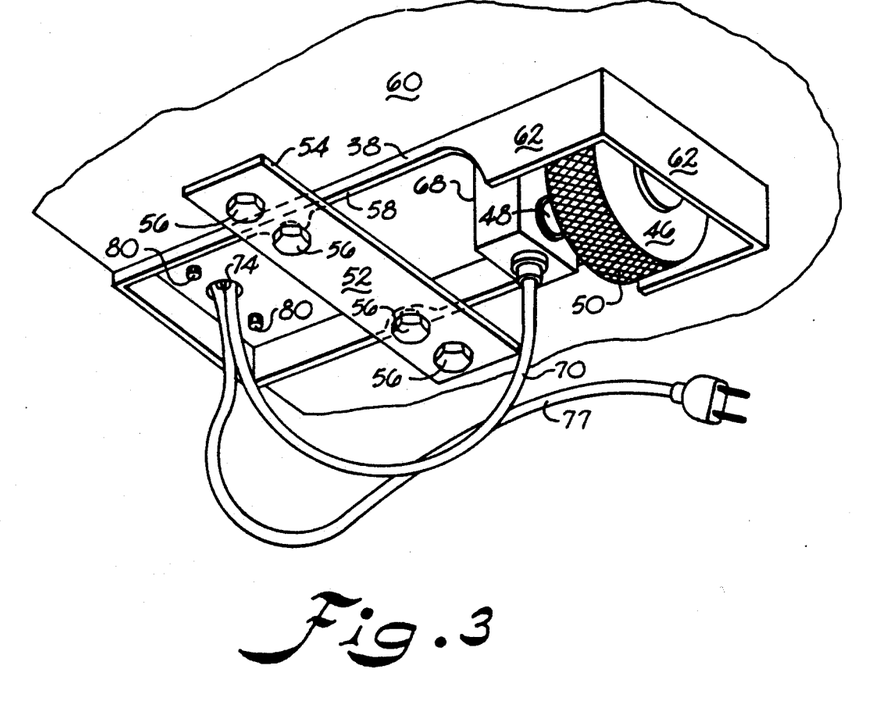
FIG. 3 is another enlarged perspective view of the exemplary embodiment of present FIG. 1, primarily illustrating a bottom perspective view thereof from beneath the upper surface of the exemplary conventional cloth cutting table.

More particularly, FIG. 2 illustrates an enlarged view of the FIG. 1 subject matter, while FIG. 3 illustrates a generally bottom perspective view thereof as see from the bottom of a conventional cloth cutting table. FIG. 4 shows a further detailed side cross-sectional view of the FIG. 2 subject matter as taken along the sectional line 4—4 therein.

Referring to all three of the greater detailed figures (FIGS. 2, 3, and 4), an electronic cloth measuring apparatus 10 in accordance with the subject invention includes a relatively rigid support base 38 which has a generally planar upper surface 40 which is illustrated as generally flush with top surface 14 of table 12. As shown, the base 38 is adapted to be mounted in a preformed slot 42 of table 12.

Support base 38 further defines an opening 44 therein through which an arc (i.e., an outside diameter segment) of a measuring wheel 46 may project. Such measuring wheel is thus mounted in the slot 42 in the table upper surface 14 on a rotatable shaft 48 such that the preferably knurled surface 50 engages cloth 22 drawn across the top or work surface of the table. As will be appreciated by those of ordinary skill in the art, such engagement causes a corresponding rotation of measuring wheel 46 in the direction of the cloth movement. Preferably, roll 46 is mounted for bidirectional rotation, so that both the drawing off of cloth in the direction of arrow 30 and withdrawal or retraction thereof (i.e., opposite to the direction of arrow 30) is sensed and followed by the measuring wheel 46.

In the specifically illustrated exemplary embodiment of the subject figures, measuring wheel 46 is illustrated as being beneath the materials or cloth 22, which are passed thereover. In general, the broader principles of the subject invention are not limited to such a relative relationship, and other relative positions may be practiced (such as with the measuring roll located above materials 22, or even beside materials 22 if they are transported in a vertical plane instead of a horizontal plane as presently illustrated).

The support base 38 may be securely mounted in the table preformed slot 42 with support base mounting means 52. Such mounting means are preferably removable so that the apparatus may be replaced as desired or substituted for another measuring apparatus previously residing in slot 42, such as the Measuregraph Somogye, Jr. '479 patented device referenced above. A plate 54 with various bolts 56 or the like is adequate for most installations, though variations may be practiced for given embodiments. As illustrated, with such an arrangement the plate 54 is secured against lower edges 58 of support base 38, and in other portions helps establish direct interconnection between mounting means 52 and the lower surface 60 of table 12. As further illustrated, support base 38 may be provided with enlarged flanges or lower elements 62 which relatively surround and protect operation of measuring wheel 46.

The illustrations of present FIGS. 1 through 4 represent a generally flush mounting of upper surface 40 with table top surface 14 within the context of the subject invention. Variations in the actual differences between the surfaces may be practiced, though a height differential of generally less than 1 inch is preferred.

Figure 4:
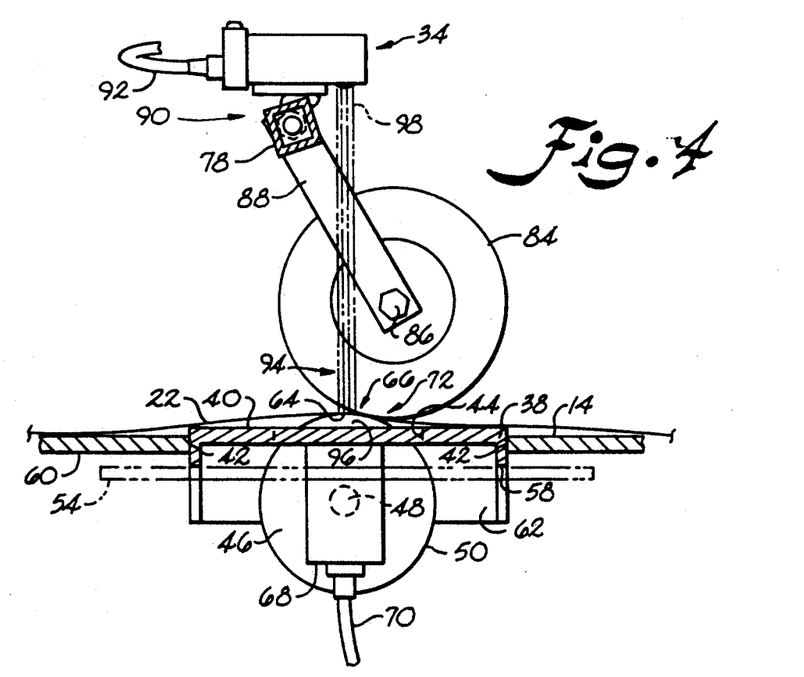
FIG. 4 is a side cross-sectional view of the embodiment of present FIG. 2, as illustrated by the sectional line 4—4 indicated in such FIG. 2.

As illustrated in particular in present FIG. 4 (and to a certain extent also in present FIGS. 1 and 2), a measuring line 64 is formed in coaxial alignment with the central axis of rotatable shaft 48 of measuring wheel 46. As shown, such measuring line 64 is formed at a predetermined location 66 at which materials 22 to be measured are brought into engagement with measuring wheel 46. In other words, the apparatus operates to make a lineal measurement of materials otherwise transported relative to measuring line 64, regardless of whether the apparatus 10 is being moved relative materials 22, or vice versa (as would generally more often be the case). In the embodiment of a cloth cutting environment, materials 22 would most likely be manually pulled past measuring line 46, as discussed hereinafter, though in some embodiments of the present invention various devices may be used to advance the materials to be measured.

Further in accordance with the present invention, shaft sensing means 68 are operatively associated with the rotatable shaft 4 of measuring roll 46. Such shaft sensing means preferably produces a distance output signal on output line 70 thereof indicative of rotation of shaft 48 as caused by materials 22 to be measured being drawn across measuring roll 46 through a cloth nip 72 formed between measuring roll 46 and another member as discussed hereinafter. More preferably, such shaft sensing means 68 distance output signal comprises a predetermined pulse which is output for every given or selected increment of rotation of shaft 48. Such a pulse arrangement may have a polarity associated therewith, such as with a positive polarity indicating rotation of shaft 48 corresponding with the advancement (direction of arrow 30) of cloth being measured, and with a negative polarity pulse indicating rotation of shaft 48 corresponding with the retraction (opposite to arrow 30) of cloth 22 being measured.

Various conventional devices are available and known to those of ordinary skill in the art, for outputting such signals or pulses responsive to rotatable shaft inputs. Additional details of such shaft sensing means 68 form no particular parts of the present invention, and are therefore not further here discussed. One exemplary shaft encoder device which is satisfactory for present purposes is the series 700 "ACCU-CODER" shaft encoder produced by the Encoder Products Company of Idaho. Other equivalent devices or devices performing an equivalent function (i.e., electronically detecting or resolving the rotation of an input shaft) may be practiced. Also, as represented in present FIGS. 3 and 4, such shaft sensing means 68 may be directly mounted to support base 38, such as with screws, bolts, or the like.

In accordance with the principles of the subject invention, the combination of shaft sensing means 68, rotatable shaft 48, and measuring wheel 46 mounted thereon, may be considered as comprising shaft encoder means in accordance with the present invention. As represented, the output signal of such means may be carried over a cable 70 through an opening 74 in support base 38 for passage through the interior thereof for cooperative interconnection with further means as discussed hereinafter. FIG. 2 represents in dotted line a cable 76 which may advantageously occupy an interior position in accordance with the present invention, so as to eliminate any interference between materials 22 and power cables (represented by cable 77 of FIG. 3) or control signal cables (represented by cable 70 of FIG. 3) otherwise operative with the present invention.

As further represented in FIGS. 1, 2, and 4, a relatively rigid support arm 78 may be secured relative cloth cutting table 12 and extended to a position generally above measuring wheel 46. Such support arm may comprise a support bracket secured to support base 38 with bolts 80 or the like or otherwise integrally formed with base 38. Bolts 80 may also be used in some embodiments to effect securement of the support base to table 12.

Support bracket 78 preferably has a free cantilevered arm 82 which extends generally over the measuring wheel 46 and adjacent surface areas of top surface 40. Biasing means 32 may in preferred embodiments be supported on such support bracket so as to bias materials 22 from an opposite side thereof relative the respective location of measuring wheel 46. Such biasing means 32 preferably may comprise a rotatable biasing member 84 which may comprise a hard rubber contact wheel or similar.

As illustrated, contact roll 84 is preferably rotatably mounted on an axis 86 which is generally in parallel alignment with central axis 48 of measuring wheel 46. In addition, a bracket 88 supporting rotation axis 86 is pivotably mounted with an arrangement 90 so that gravitational forces may be used to bias contact wheel 84 towards measuring wheel 46. Other biasing arrangements (including nongravity based devices) may be practiced. As understood by those of ordinary skill in the art, a cloth (or materials) nip 72 is formed as such rolls 46 and 84 are brought together, and cloth 22 to be measured passes through such cloth nip 72 and in between measuring roll 46 and contact roll 84.

As further represented in FIGS. 1, 2, and 4, the support bracket or arm 78 may be mounted at an angle to upper surface 14 of table 12, so that the pivotably mounted contact wheel 84 is at a similar angle, thereby facilitating its use with an arrangement wherein cloth is directed to be drawn off in the direction of arrow 30. It will be further appreciated by those of ordinary skill in the art that the exact width of the cloth or materials 22 is not critical so long as the materials to be measured are passed through nip 72 for biased engagement with surface 50 of measuring wheel 46.

Further preferably supported on support bracket 78 are materials sensor means 34 for producing a control signal on line 92 indicative of the presence (or absence) at the predetermined location 66 of materials to be measured. Though different forms of materials sensor means may be practiced with different types of materials, fabrics, or paper materials being drawn over a table surface similar to that illustrated in present FIG. 1, those generally opaque in nature are suitably sensed with optical detection means such as using an optical beam to detect the presence of such materials. Different types of optical detection may be utilized. In the present exemplary embodiment, an electric eye device may be utilized for transmitting an optical beam 94 towards a reflective element 96 received generally adjacent measuring wheel 46 in alignment with the central rotation axis 48 thereof. One form of such an optically reflective element may include an added member such as a mirrored surface or an integrally retained surface 40, such as chromium metal or similar used for the entire construction of surface 40 or a portion thereof.

The optical detection means 34 may further include means for receiving the optical beam 98, if and when such is reflected from reflective element 96. FIG. 4 generally indicates a portion of the optical beam as comprising the reflected beam 98, but those of ordinary skill in the art will appreciate that in the exemplary solid line illustration of present FIG. 4, an actual optical beam would be blocked by materials 22 from being reflected from reflective element 96 to optical detection means 34. Hence, such a condition would be indicative to optical detection means 34 of the presence in the desired location of materials 22 to be measured.

Various off-the-shelf components are readily available to those of ordinary skill in the art, and specific details thereof do not form detailed features of the subject invention. One example of an acceptable such component is the series 55 electric eye product of OPCON, Inc., of Everett, Wash. Such electric eye may be utilized as a reflex or reflective system (with or without polarization), as a proximity system, or as a "through-beam" system. Various embodiments of the present invention may make use of such different forms or types of optical detection, as well as other equivalent means. Also, various mounting features may be utilized as so as permit fine adjustment of optical detection beams, or equivalent ultrasonic devices or the like, additional details of which are not required here for complete understanding of the subject invention.

The last remaining major component to be discussed of a given operative embodiment in accordance with the subject invention relates to the electronic tallying means 36. As illustrated, such means 36 may be supported on the top of support arm 78, which very beneficially provides a free and clear view of displayed cloth measurements to the operator of cloth cutting table 12. As understood by those of ordinary skill in the art, the operator stands on the near side of table 12 (in the FIG. 1 view) and draws cloth 22 off of roller 20 in the direction of arrow 30. Hence, such operator is facing towards the front of means 36, and no objects, wires, or other elements block the operator's view. In some embodiments, means 36 could be located apart from table 12, not supported on member 78.

Means 36 may comprise various components in accordance with the present invention, which will vary in exact construction from one embodiment to another. For example, if shaft sensing means 68 outputs a particular form of a predetermined pulse to indicate incremental shaft rotation, then means 36 should be compatible with and responsive to such pulse type. Also, if a polarity indication is utilized with the pulse information on control line 70, then means 36 should be likewise responsive to such polarity indications so as to correspondingly add or subtract to a continuing measurement being accumulated.

Generally speaking, means 36 preferably comprises counter means generally 100 responsive to shaft rotation pulses on control line 70 from shaft sensing means 68, and responsive to cloth presence or absence signals on control line 92 from optical proximity means 34 or other equivalent devices. Such counter means 100 is responsive to such signals for determining the lineal amount of cloth 22 having passed over the center line (i.e., across central axis 48) of the measuring wheel 46 during a given measuring operation. Means 36 preferably further includes display means generally 102 for numerically displaying the determined lineal amount of cloth or materials 22. Preferably, display means 102 is appropriately calibrated and scaled so that the output thereof reads in yards. Other units may be practiced in various embodiments of the invention. Typically, resolution down to at least tenths of yards is preferred and for greatest accuracy, down to at least hundredths of yards. FIG. 2 illustrates an exemplary display lineal amount of cloth reading as 10.28 yards total.

Since FIG. 2 illustrates an exemplary total lineal cloth measurement of 10.28 yards, but no material received between measuring roll 46 and contact roll 84, FIG. 2 represents operation of means 36 wherein such means holds an accumulated measurement or count even after a trailing edge of materials departs from between rolls 46 and 84. FIG. 2 further illustrates a reset/clear control button 104 by which an operator of cloth cutting table 12 may clear the contents of display means 102 from a prior measuring operation so that a new lineal measurement may be commenced for a subsequent segment of materials to be passed between rollers 46 and 84.

While inclusion of a numerical display means 102 is represented in present FIG. 2 as a preferred embodiment, it is within the broader principles of the subject invention that measurements may be made without expressly displaying such to the operation. For example, an operator might be drawing off a given amount of materials (not limited strictly to fabrics) to adequately fit a given production need, and apparatus 10 may be used simply to remotely monitor the amount of materials being drawn off from a given stock of inventory associated with roll 20.

Still further, it is to be understood by those of ordinary skill in the art that various off-the-shelf components are readily available to satisfactorily perform the functions of means 36, or the component counter means 100 and numerical display means 102 thereof. Within the context of the subject invention, means 100 (when including a numerical display) may also be considered as constituting display means for receiving the shaft sensing means distance output signal on line 70 and the cloth sensing means cloth presence output signal on line 92 and for displaying the total length of cloth drawn across measuring roll 46 and past central shaft axis 48 thereof during a given measuring operation. Of course, actual manual manipulation by an operator of materials 22 will determine the given segment of such materials which are to be measured (and/or cut) for constituting a given measuring operation.

Those of ordinary skill in the art will appreciate that specific internal details of means 36 comprise no specific features of the subject invention, wherefore explicit illustration of such circuitry, etc., is not required for a complete and enabling understanding of the subject invention. One example of available components which are fully satisfactory for comprising means 36, or any subcomponents thereof, is represented by the Durant-brand Ambassador No. 57600 series count controller available from the Eaton Corporation of Watertown, Wis. Such device comprises an ideal component for means 36, and is a programmable counter which may be programmed to receive a variety of predetermined pulse types from various component shaft sensing means, and likewise from various component materials sensor means. For example, such Durant programmable controller may be programmed so as to understand a "high" signal as indicating the presence of materials sensed by means 34, or as indicating the absence of materials being sensed by means 34. In either event, the information is appropriately processed so as to hold an accumulating count upon indication that there is an absence of materials at the predetermined location 66.

Similarly, such Durant series count controller may be used as a bidirectional counter means for adding or subtracting accordingly to the lineal amount of cloth being determined, depending on the direction in which the measuring wheel 46 is rotated, such as might be represented by changing polarity pulses as discussed above.

In addition, the present illustration of FIGS. 1 and 2 represents further exemplary control buttons 106 such as may be provided for initially programming the Durant controller in accordance with the subject invention so as to accept predetermined types of pulses for shaft sensing or for materials sensing, or to indicate lineal measurements in desired or designated units and with the desired degree of resolution (for example, in tenths or hundredths of yards). It will be further understood by those of ordinary skill in the art that, after programming of such means 36, further changes thereto may be locked out from access by an operator of cloth cutting table 12, so that primarily the operator very simply and efficiently works with the remaining illustrated apparatus and the reset/clear operation 104 thereof. It will be appreciated that programming of the Durant count controller may involve calibrating same to the predetermined radius of measuring wheel 46, as will be readily understood by those of ordinary skill in the art. Those of ordinary skill in the art are referred to the 28 page Installation and Operation Manual Number 57600-902-01 of the Eaton Corporation for any further necessary information or the like of such exemplary construction of means 36.

It should be further understood by those of ordinary skill in the art that certain embodiments of the present invention may comprise combinations of the apparatus 10 and materials handling work structure such as exemplary cloth cutting table 12. In some embodiments, a preformed slot 42 will not need to be formed, but instead a relatively smaller opening such about the same as opening 44 may be formed directly in the upper surface 14 of support table 12. In other words, various features of the presently illustrated support base 38 may be integrally formed into the surface 14 of a table 12 where so desired in given embodiments of the subject invention.

It will be further understood by those of ordinary skill in the art that various modifications and variations may be provided, such as to accommodate application of the broader principles of the subject invention to use with given materials. For example, a toothed measuring wheel instead of a measuring wheel have a knurled surface might be used to desirably engage materials to be measured constituting a sprocket chain or the like. Other forms of components may also be practiced depending on various materials. For example, certain optical proximity means may be generally inoperative with see-through materials, such as plastic wraps or the like. In such instances, ultrasonic sensors or other substitute means may be practiced. Still further, certain embodiments may be modified to accommodate materials having different widths from that illustrated. For example, certain embodiments may be practiced with cloth or other fabrics having widths up to tens of feet, while other embodiments might be practiced with relatively narrow width ribbon or the like.

It will be further understood by those of ordinary skill in the art that the foregoing presently preferred embodiments are exemplary only, and that the attendant description thereof is likewise by way of words of example rather than words of limitation, and their use does not preclude inclusion of such modifications, variations, and/or additions to the present invention which would be readily apparent to one of ordinary skill in the art, the scope of the present invention being set forth in the appended claims.

What is claimed is:

1. An electronic cloth measuring apparatus for use on a cloth cutting table having associated therewith roller means for receiving a roll of cloth to be drawn off such roll at user selected lengths and cut, and further having an adjacent upper surface forming a primary work area with a slot therein across which the cloth is drawn prior to cutting, said measuring apparatus comprising:

a measuring roll mounted in the slot in the table upper surface and on a rotatable shaft with a given arc of the outside diameter of said measuring roll projecting just above the table upper surface so that said measuring roll engages cloth drawn thereacross and rotates correspondingly;

a relatively rigid support arm secured relative the cloth cutting table and extending to a position generally above said measuring roll;

a contact roll rotatably mounted on said support arm and extendable therefrom so as to form a cloth nip in cooperation with said measuring roll so that cloth to be measured passes across the table upper surface through said cloth nip and in between said measuring roll and said contact roll;

shaft sensing means, operatively associated with said measuring roll rotatable shaft, for producing a distance output signal based on rotation of said shaft caused by cloth to be measured being drawn across said measuring roll through said cloth nip;

cloth sensing means, operatively associated with the axis of said measuring roll rotatable shaft, for producing a cloth presence output signal indicative of whether cloth is present at a point in alignment with said shaft axis to be drawn through said cloth nip; and display means for receiving said shaft sensing means distance output signal and said cloth sensing means cloth presence output signal and for displaying the total length of cloth drawn across said measuring roll and past said shaft axis of said measuring roll rotatable shaft during a given measuring operation;

wherein said measuring roll has a knurled surface for cloth engagement; and said display means is calibrated for displaying cloth total length down to tenths of yards; and wherein said apparatus further includes a support base received in the table upper surface slot and supporting said measuring roll and said support arm thereon.

2. An electric cloth measuring apparatus as in claim 1, wherein said cloth sensing means includes optical output and receiving means operative with a reflective target above which cloth is passed, so that the presence of cloth is indicated by blockage of the optical reflective path as cloth resides over the reflective target.

3. An electric cloth measuring apparatus as in claim 1, wherein:

said shaft sensing means distance output signal comprises a predetermined pulse which is output for every increment of rotation of said shaft, which pulse has a positive polarity for indicating rotation of said shaft corresponding with the advancement of cloth being measured and a negative pulse for indicating rotation of said shaft corresponding with the retraction of cloth being measured; and said display means includes bidirectional counter means for accumulating said predetermined pulses including accounting for polarities thereof so as to determine said total length of cloth.

4. An electric cloth measuring apparatus as in claim 1, wherein said display means includes reset means for clearing a displayed total length of cloth for a given measuring operation in order to commence a subsequent measuring operation, and further includes means for holding a displayed total length whenever said cloth sensing means indicates the absence of cloth, even if said measuring roll is rotated thereafter by momentum or other forces.

5. An electric cloth measuring apparatus as in claim 1, wherein:
said cloth sensing means and said display means are supported on said support arm; and
said display means is calibrated for reading at least down to hundredths of yards.

6. An electric cloth measuring apparatus as in claim 1, wherein:
said cloth sensing means comprises an optical sensing device mounted on said support arm and adjusted so as to detect the presence of cloth along said shaft axis just laterally adjacent to said cloth nip;
said shaft sensing means comprises a shaft encoder for outputting a count pulse for each predetermined incremental rotation of said measuring roll; and
said display means includes programmable counter means for counting said shaft encoder count pulses and displaying the cloth total length in designated units and degree of resolution.

7. An improved lineal cloth measuring device for insertion into a slot preformed in the top surface of a cloth cutting table, across which top surface cloth is drawn to be measured and cut, said device comprising:
a relatively rigid support base having a generally planar upper surface with a measuring wheel opening therein and a reflective member adjacent to said opening, said base adapted to be mounted in the cloth cutting table preformed slot;
support base mounting means for securely mounting said support base in the table preformed slot with said upper surface thereof generally flush with the table top surface;
shaft encoder means, having a rotatable shaft with a friction surface measuring wheel mounted thereon, for producing a predetermined shaft rotation pulse each time said measuring wheel is rotated a given amount, said shaft encoder means being mounted on said support base such that said measuring wheel projects through said measuring wheel opening so as to engage and be correspondingly rotated by cloth being drawn thereover;
a support bracket secured to said support base and having a free cantilevered arm extending generally over said measuring wheel and over said support base reflective member adjacent thereto;
a relatively freely rotatable pressure contact wheel pivotably received on said support bracket and above said measuring wheel so that gravity acting on said contact wheel tends to force any cloth between said wheels into engagement with said measuring wheel;
optical proximity means, mounted on said support bracket and above said reflective member on said support base upper surface, for projecting an optical beam towards said reflective member and in alignment with the centerline of said rotatable shaft on which said measuring wheel is mounted, and for outputting a cloth absent signal whenever said optical beam is reflected to said optical proximity means from said reflective member; and
counter means responsive to said shaft encoder means shaft rotation pulses and said optical proximity means cloth absent signal for determining the lineal amount of cloth having passed over the centerline of said measuring wheel during a given measuring operation, and including display means for numerically displaying such determined lineal amount of cloth.

8. An improved lineal cloth measuring device as in claim 7, wherein said counter means includes means for resetting to zero the determined amount of cloth prior to commencing a subsequent measuring operation.

9. An improved lineal cloth measuring device as in claim 8, wherein said counter means includes means operative to hold in said display means a determined lineal amount of cloth whenever said optical proximity means is operative to indicate an absence of cloth at said measuring wheel rotatable shaft centerline.

10. An improved lineal cloth measuring device as in claim 9, wherein:
said measuring wheel is freely rotatable in alternate directions responsive to the direction in which cloth is drawn thereover;
said shaft encoder means further includes means for indicating in said shaft rotation pulses thereof the direction of such measuring wheel rotation; and
said counter means includes means for adding or subtracting accordingly to the lineal amount of cloth being determined, depending on the direction in which the measuring wheel is rotated, so that a user may pull back under said measuring wheel some of the previously advanced cloth in order to reach a desired length of cloth on said display means.

11. An improved lineal cloth measuring device as in claim 10, wherein:
said measuring wheel friction surface comprises a knurled surface; and
said display means is calibrated so as to display said determined lineal amount of cloth in yards.

12. An improved lineal cloth measuring device as in claim 11, wherein:
said reflective member comprises a reflective metal integrally formed with said support base upper surface;
said display means is calibrated so as to display said determined lineal amount of cloth in hundredths of yards; and
said counter means is mounted on said support bracket with an electric power cord therefor passed through the cloth cutting table upwardly through said support bracket at least partially within the interior thereof.

13. An improved lineal cloth measuring device as in claim 7, further in combination with a cloth cutting table having a top surface comprising a work area for a user to draw cloth thereacross, with a slot preformed in such top surface thereof for receiving said support base, and further having associated with said table roller means for receiving a roll of cloth to be drawn off such roll at user selected lengths to be measured with said device for cutting of such cloth.

* * * * *